US012217549B1

(12) United States Patent
Schwartz et al.

(10) Patent No.: US 12,217,549 B1
(45) Date of Patent: Feb. 4, 2025

(54) SYSTEM AND METHOD FOR MATCHING A VOICE SAMPLE TO A FACIAL IMAGE BASED ON VOICE AND IMAGE METAPROPERTIES

(71) Applicant: Corsound AI Ltd, Tel Aviv (IL)

(72) Inventors: Nir Schwartz, Ramat-Gan (IL); Arkady Krishtul, Zichron Yakov (IL)

(73) Assignee: CORSOUND AI LTD., Tel Aviv (IL)

(*) Notice: Subject to any disclaimer, the term of this patent is extended or adjusted under 35 U.S.C. 154(b) by 0 days.

(21) Appl. No.: 18/632,397

(22) Filed: Apr. 11, 2024

(51) Int. Cl.
| | |
|---|---|
| *G06V 40/70* | (2022.01) |
| *G06V 10/764* | (2022.01) |
| *G06V 10/774* | (2022.01) |
| *G06V 10/776* | (2022.01) |
| *G06V 40/16* | (2022.01) |
| *G10L 17/02* | (2013.01) |
| *G10L 17/04* | (2013.01) |
| *G10L 17/10* | (2013.01) |

(52) U.S. Cl.
CPC .......... *G06V 40/70* (2022.01); *G06V 10/764* (2022.01); *G06V 10/774* (2022.01); *G06V 10/776* (2022.01); *G06V 40/172* (2022.01); *G06V 40/179* (2022.01); *G10L 17/02* (2013.01); *G10L 17/04* (2013.01); *G10L 17/10* (2013.01); *G06V 2201/10* (2022.01)

(58) Field of Classification Search
None
See application file for complete search history.

(56) References Cited

PUBLICATIONS

Horiguchi, Shota, Naoyuki Kanda, and Kenji Nagamatsu. "Face-voice matching using cross-modal embeddings." Proceedings of the 26th ACM international conference on Multimedia. 2018. (Year: 2018).*
Jain, Anil, Karthik Nandakumar, and Arun Ross. "Score normalization in multimodal biometric systems." Pattern recognition 38.12 (2005): 2270-2285. (Year: 2005).*
Smith, Harriet MJ, et al. "Concordant cues in faces and voices: Testing the backup signal hypothesis." Evolutionary Psychology 14.1 (2016): 1474704916630317. (Year: 2016).*
Verlinde, Patrick, and G. Cholet. "Comparing decision fusion paradigms using k-NN based classifiers, decision trees and logistic regression in a multi-modal identity verification application." Proc. Int. Conf. Audio and Video-Based Biometric Person Authentication (AVBPA). 1999. (Year: 1999).*
Skinner, B. F. (1958). Reinforcement today. *American Psychologist*, 13(3), 94-99.
Yandong Wen et al., Disjoint Mapping Network for Cross-modal Matching of Voices and Faces, arXiv: 1807.04836 [cs.CV], Jul. 16, 2018.

(Continued)

*Primary Examiner* — Sean M Conner
(74) *Attorney, Agent, or Firm* — PEARL COHEN ZEDEK LATZER BARATZ LLP

(57) ABSTRACT

System and method for matching a voice sample to a facial image may include, using a processor: obtaining a voice sample and a facial image; calculating a plurality of voice metaproperties from the voice sample; calculating a plurality of image metaproperties from image sample, where each of the image metaproperties corresponds to one of the voice metaproperties; and determining a level of match between the voice sample and the facial image, based on the plurality of voice metaproperties and the plurality of image metaproperties.

12 Claims, 5 Drawing Sheets

(56) References Cited

PUBLICATIONS

Arsha Nagrani et al., Seeing Voices and Hearing Faces: Cross-modal biometric matching, arXiv:1804.00326 [cs.CV], Apr. 3, 2018.

A. Zheng et al., "Adversarial-Metric Learning for Audio-Visual Cross-Modal Matching," *IEEE Transactions on Multimedia*, vol. 24, pp. 338-351, 2022 (Aug. 2015). doi: 10.1109/TMM.2021.3050089.

* cited by examiner

SYSTEM AND METHOD FOR MATCHING A VOICE SAMPLE TO A FACIAL IMAGE BASED ON VOICE AND IMAGE METAPROPERTIES

FIELD OF THE INVENTION

The present invention relates generally to matching a voice sample to a facial image; by way of non-limiting example, a voice sample may be matched to a facial image or vice versa based on voice and image metaproperties.

BACKGROUND

It has been shown experimentally that human appearances are associated with their voices. For example, properties like age, gender, ethnicity, and accent may influence both the facial appearance and the voice. In addition, there exist other, more subtle properties that influence both the facial appearance and voice, such as the level of specific hormones.

Voice face matching problems may be defined by the following task: provided with a sample of a person's voice and a plurality of images of a plurality of persons, determine which face belongs to the speaker.

Current solutions to the voice face matching problem typically require training machine learning (ML) models to generate embeddings of the voice samples and facial images. Voice-face matching, e.g., the likelihood that a voice sample matches a facial image and both originate from the same person, may be determined based on the distance between the latent vectors.

SUMMARY

According to embodiments of the invention, a computer-based system and method for matching a voice sample to a facial image may include, using a processor: obtaining a voice sample and a facial image; calculating a plurality of voice metaproperties from the voice sample; calculating a plurality of image metaproperties from image sample, where each of the image metaproperties corresponds to one of the voice metaproperties; and determining a level of match between the voice sample and the facial image, based on the plurality of voice metaproperties and the plurality of image metaproperties.

According to some embodiments of the invention, each of the voice metaproperties and the image metaproperties may include a probability distribution providing the probabilities that the voice metaproperty or the image metaproperty equals certain values of the metaproperty.

According to some embodiments of the invention, determining whether the voice sample matches the facial image may include: calculating a distance between each of the voice metaproperties and the corresponding image metaproperty; calculating a weighted sum of the distances; and determining that the voice sample matches the facial image if the weighted sum satisfies a threshold condition, and that the voice sample does not match the facial image otherwise.

According to some embodiments of the invention, calculating weights for the weighted sum operation may be done by training a classifier and deriving the weights from the parameters of the classifier.

According to some embodiments of the invention, the classifier may be a binary classifier.

According to some embodiments of the invention, the classifier may be trained by: obtaining a labelled dataset comprising a plurality of matching pairs labelled as matching pairs, and a plurality of unmatching pairs, labelled as unmatching pairs, where each of the matching pairs comprises a matching labelled voice sample and labelled facial image, and each of the unmatching pairs comprises an unmatching labelled voice sample and labelled facial image; calculating, for each of the labelled voice samples, the plurality of voice metaproperties from the labelled voice sample; calculating, for each of the labelled facial images, the plurality of image metaproperties from the labelled facial image; and using the plurality of voice metaproperties and the plurality of image metaproperties of the plurality of matching pairs and the plurality of unmatching pairs, and the associated labels, to train the classifier.

According to some embodiments of the invention, calculating one voice metaproperty of the plurality of voice metaproperties may include: encoding the voice sample into a voice representation using a voice encoder; and calculating the vector of voice metaproperties from the voice representation; and where calculating one image metaproperty of the plurality of image metaproperties comprises: encoding the facial image into an image representation using a face encoder; and calculating a vector of image metaproperties from image representation.

According to some embodiments of the invention, each of the metaproperties may include an identity characteristic of an individual.

According to some embodiments of the invention, the metaproperties may include at least one property selected from: age, gender, weight, body mass index (BMI), skin tone, mother tongue and accent.

Embodiments of the invention may include obtaining a plurality of facial images; determining a level of match between the voice sample and each the facial images; selecting the facial images with a highest level of match; and reconstructing the face of the speaker in the voice sample by fusing the selected facial images.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
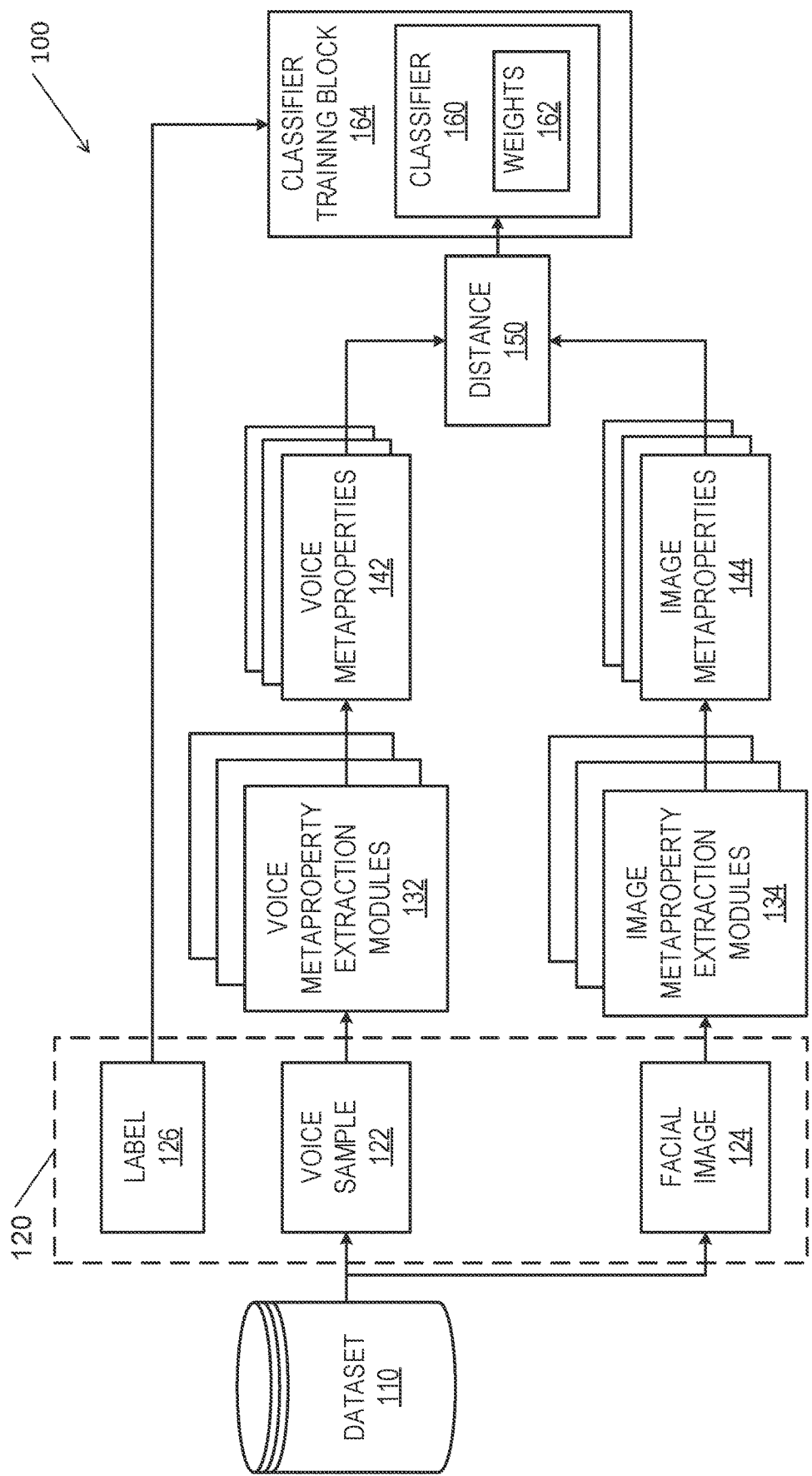
FIG. 1 depicts a system for training voice-face matching classifier, according to embodiment of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Prior art solutions to the voice face matching problem typically require training ML models to generate embeddings of the voice samples and facial images. The ML models, typically deep leaning neural networks, may be trained so that the distance between latent vectors of voices and faces that originate from the same person will be smaller than the distance between latent vectors of voices and faces that originate from two different persons. Thus, voice-face matching, e.g., the likelihood that a voice sample matches a facial image, and both originate from the same person, may be determined based on the distance between the latent vectors.

ML based solutions as described above may have some significant drawbacks in terms of explainability, accuracy, precision, recall, scalability and cost effectiveness. Deep learning models may be challenging to comprehend. Due to the convoluted architecture of the models that typically involve plethora of parameters and hyper-parameters, it is often highly challenging to understand the reason why a given audio sample is matched or is not matched by the network to a specific face. It is also hard to tell in advance which faces will be easier or harder to match to an audio sample (e.g., with higher or lower chances to succeed). Even worse, if a prediction of the model is wrong, it may be unclear what causes the fault and how it can be fixed. Sources for erroneous matching by an ML model may include bias in data used for training the model, suboptimal selection of hyper-parameters, over fitting of the ML model, and more. However, when faced with low success rate, it is hard or impossible to know which of all those causes is the source of the problem, which can lead to difficulties in debugging and in increasing the system accuracy, precision and recall.

Prior art ML based systems may also have the problem of low generalizability. It is natural to fine-tune existing models (once trained) when their performance drops due to the addition of many new people of interest (POIs), e.g., people with characteristics that the ML model was not initially trained for. For example, if the ML model has been trained to match faces and voices of adults, it may have to be retrained to match voices and faces of adolescents. Every such retraining may require a long and tedious adjustments of hyper-parameters, where each fine tuning may take a large period of time and incur considerable costs. Thus, maintenance and generalization of such models may be complex and costly.

Last and foremost, deep ML models for voice-face matching may be inaccurate even if the audio and faces are encoded using state-of-the-art (SOTA) embeddings. Training deep ML models often overfits the data and the general accuracy of such models may not be sufficient to tell one person from another.

Embodiments of the invention may provide a system and method for matching or correlating a voice sample to a facial image. Embodiments of the invention may match a voice sample to a facial image based on corresponding metaproperties extracted from the voice sample and the facial image. A metaproperty, also referred to as metadatum, may include an identity characteristic of the individual whose voice is recorded in the voice sample or whose face is captured in the facial image, such as age, gender, weight, body mass index (BMI), skin tone, mother tongue, accent, etc. In some embodiments, the voice metaproperties and the image metaproperties may include a probability distribution providing the probabilities that the voice metaproperty or the image metaproperty equals certain values of the metaproperty. Thus, embodiments of the invention may extract or estimate a value, a value range, or a probability distribution, of a metaproperty, e.g., age, from a voice sample, and extract the same metaproperty from a facial image, and may repeat this process for a plurality of metaproperties. Embodiments of the invention may determine a level of match between the voice sample and the facial image, based on the plurality of voice metaproperties and the plurality of image metaproperties, e.g., using a classifier.

For example, embodiments of the invention may determine a level of match between the voice sample and the facial image by calculating a distance between each of the voice metaproperties and the corresponding image metaproperty, calculating a weighted sum of the distances, and determining that the voice sample matches the facial image if the weighted sum satisfies a threshold condition, and that the voice sample does not match the facial image otherwise. According to some embodiments, the trainable parameters of the classifier may be the weights for the weighted sum, or may be used to extract or calculate the weights for the weighted sum. According to some embodiments, the weights for the weighted sum (e.g., the parameters of the classifier) operation may be calculated by training the classifier and adjusting its weights.

In some embodiments, the classifier may be trained using a labelled dataset including a plurality pairs of matching voice samples and facial images, labelled as matching pairs, and a plurality of pairs of unmatching voice samples and facial images, labelled as unmatching pairs by calculating a plurality of voice metaproperties for each of the voice samples in the matching and unmatching pairs, and a plurality of image metaproperties for each of the facial images in the matching and unmatching pairs, and using the plurality of voice metaproperties and the plurality of image metaproperties and the associated labels, to train the classifier.

Thus, embodiments of the invention may improve the technology of voice-face matching by providing a method that relies on voice and face metaproperties, instead of using a dedicated deep ML model. Embodiments of the invention may use ML models for extracting the metaproperties.

However, these ML models according to some embodiments of the invention may be much smaller and simpler than a deep ML model used for voice-face matching. In some cases, off-the-shelf or previously trained ML models may be used, for example, to extract an age or a gender from a voice sample or a facial image.

Embodiments of the invention may combine deep ML models and classical methods for associating a given voice with several approximate faces that have matching metaproperties. Embodiments of the invention may provide high levels of explainability of the results of the model since it may be possible to investigate the metaproperties and discover the possible sources of an error. Embodiments of the invention may provide easy generalization and high levels of flexibility since adding more metaproperties only requires adding modules for extracting those metaproperties from voice samples and facial images, and retraining the classifier to get new weights. Other modules of the system, e.g., modules that extract other metaproperties do not have to be retrained. Similarly, when adding new POIs with new characteristics, each module may be trained and tested separately, which may decrease the complexity of the training process and may increase the accuracy of the retrained system. Embodiments of the invention may increase the robustness to outliers in comparison to prior art systems, since each module of the system may be less affected by rare outliers.

Some practical applications examples of voice face matching may include criminal investigations where a sample of the voice is the only evidence: for example, the voice sample together with an image of a suspect may be provided to the system that may provide determination (and/or a confidence level) whether the voice and face belong to the same person or not. Another application may include deepfake speech synthesis detection, in which a fake audio is combined with a video of a person. In this case the audio may be provided together with an image of the talking person taken from the video, and the system may be provided to the system that may provide determination (and/or confidence level) whether the voice and face belong to the same person or not.

Embodiments of the invention may provide a probability that a speech sample and a face image match. Thus, embodiments of the invention may be used for, for example:
- Face database sorting-given a speech sample and a database of face photos, embodiments of the invention may be used to sort the database in order of probability that the person on the photo is the speech sample owner.
- Voice database sorting-given a photo of a person and a database of speech samples, embodiments of the invention may be used to sort the database in order of probability that the speech belongs to the person in the photo.
- Comparing probabilities-quantitatively comparing relative probabilities that a speech sample belongs to a first person rather than a second person.

According to embodiments of the invention, the voice and face encoders may include one or more neural networks (NN). NNs are computing systems inspired by biological computing systems, but operating using manufactured digital computing technology. NNs are mathematical models of systems made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning or training proceeds typically using a loss function. The weight increases or decreases the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning using a loss function.

Some embodiments of the invention may include other deep architectures such as transformers, that may include series of layers of self-attention mechanisms and feedforward neural networks, used for processing input data. Transformers may be used in light of their capacity of parallelism and their multi-headed self-attention which facilitate features extraction.

Various types of NNs exist. For example, a convolutional neural network (CNN) can be a deep, feed-forward network, which includes one or more convolutional layers, fully connected layers, and/or pooling layers. CNNs are particularly useful for visual applications. Other NNs can include for example time delay neural network (TDNN) which is a multilayer artificial neural network that can be trained with shift-invariance in the coordinate space.

In practice, an NN, or NN learning, may be performed by one or more computing nodes or cores, such as generic central processing units or processors (CPUs, e.g. as embodied in personal computers), graphics processing units (GPUs), or tensor processing units (TPUs). which can be connected by a data network.

The facial images may be provided in any applicable computerized image format such as joint photographic experts group (JPEG or JPG), portable network graphics (PNG), graphics interchange format (GIF), tagged image file (TIFF), etc., and the voice or speech sample may be provided in any applicable computerized audio format such as MP3, MP4, M4A, WAV, etc.

The voice samples and facial images may be provided to one or more voice or image encoders (e.g., NNs), that may each generate an embedding, e.g., a latent space vector, also referred to herein simply as a latent vector, a latent matrix, a signature or a feature vector, in a feed forward process, for each of the voice and images. As used herein, an embedding may include a reduced dimension (e.g., compressed) representation of the original data, generated for example by an ML model or an encoder. The embedding may include a vector (e.g., an ordered list of values) or a matrix that represents the original data in a compressed form that, if generated properly, includes important or significant components or characteristics of the raw data. Embodiments of the invention may use embedding to extract metaproperties, where different embedding may be generated for different metaproperties.

Figure 6:
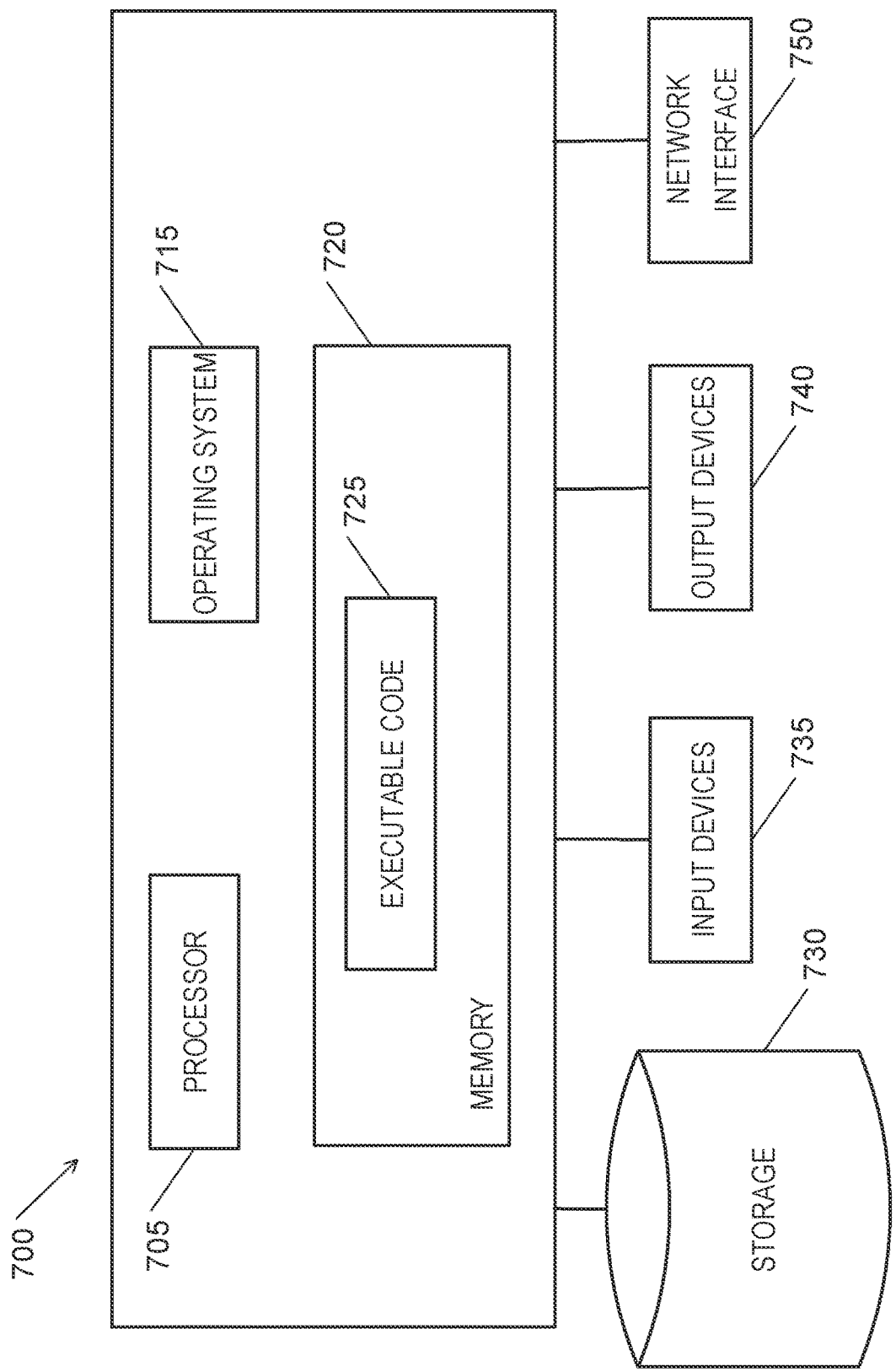
FIG. 6 shows a high-level block diagram of an exemplary computing device which may be used with embodiments of the present invention.

Reference is made to FIG. 1, which depicts a system 100 for training voice-face matching classifier 160, according to embodiment of the invention. It should be understood in advance that the components and functions shown in FIG. 1 are intended to be illustrative only and embodiments of the invention are not limited thereto. While in some embodiments of the system of FIG. 1 are implemented using systems as shown in FIG. 6, in other embodiments other systems and equipment can be used.

Dataset 110 may include labelled pairs 120 of matching and unmatching voice samples 122, also referred to as speech samples) and facial images 124, e.g., voice samples 122 and facial images 124 of the same person or of different persons, respectively. Dataset 110 may be stored, for example, on storage 730 presented in FIG. 6. Pair 120 may be labelled by label 126 indicative whether pair 120 includes matching or unmatching voice samples 122 and facial images 124. In some embodiments, dataset 110 may include a face dataset including facial images and an audio dataset including audio recordings. Each of the facial images and audio recordings may be associated with metadata including speaker identification numbers (IDs) and ground truth values of the meta-properties. A facial image and an audio recording may be matched into pair 120 based on the speaker IDs, e.g., a facial image and an audio recording having the same speaker IDs may be matched and provided with a label 126 indicating that the facial image and audio recording are of the same person, and a facial image and an audio recording having different speaker IDs may be matched and provided with a label 126 indicating that the facial image and audio recording are not of the same person.

Figure 2A:
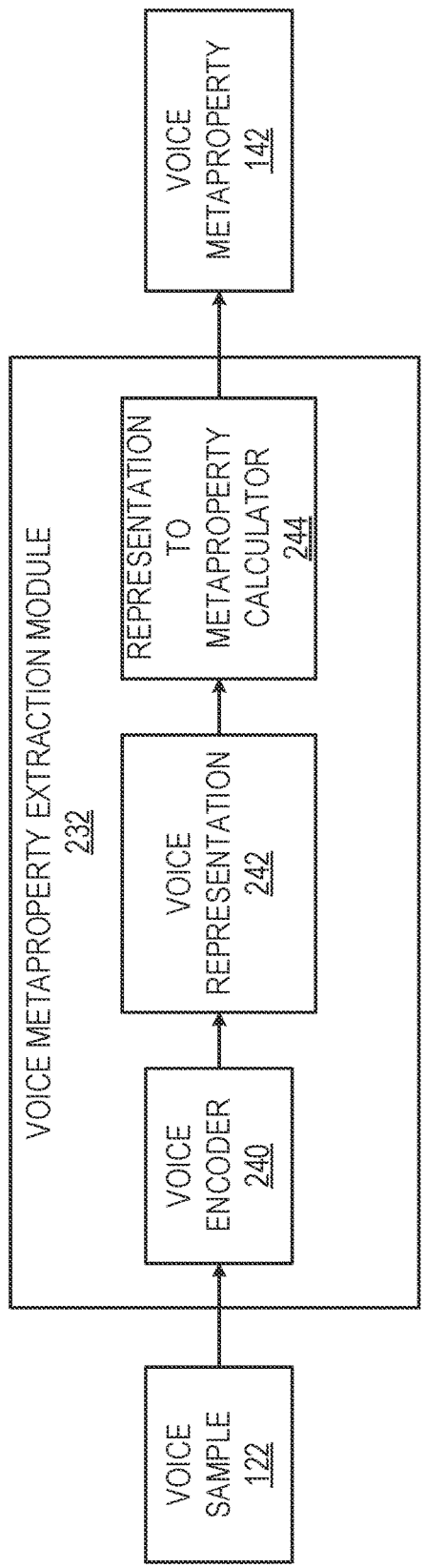
FIG. 2A depicts a voice metaproperty extraction module, according to embodiment of the invention.

Each of voice metaproperty extraction modules 132 may be configured to estimate, calculate or extract a voice metaproperty 142 from a voice sample 122. Each of voice metaproperties 142 may include an identity characteristic of the person speaking in voice sample 122 such as the age, gender, weight, body mass index (BMI), skin tone, mother tongue, accent of the person speaking. Some voice metaproperties 142 may be estimated, calculated or extracted directly from voice sample 122, while other may include an intermediate stage of extracting or calculating a voice representation 242, using, for example, an ML voice encoder 240, and extracting, estimating or calculating voice metaproperty 142 from voice representation 242, e.g., as depicted in FIG. 2A. For some voice metaproperties 142, voice representation 242 may include a voice latent vector, a voice latent matrix or an embedding. For some voice metaproperties 142, voice representation 242 may include a representation of the voice in the form of one or more matrices or an image, e.g., a spectrogram, or a red channel matrix, a green channel matrix and a blue channel matrix, or other matrices or images that are calculated based on voice sample 122 by voice encoder 240. Other representations may be used.

Figure 2B:
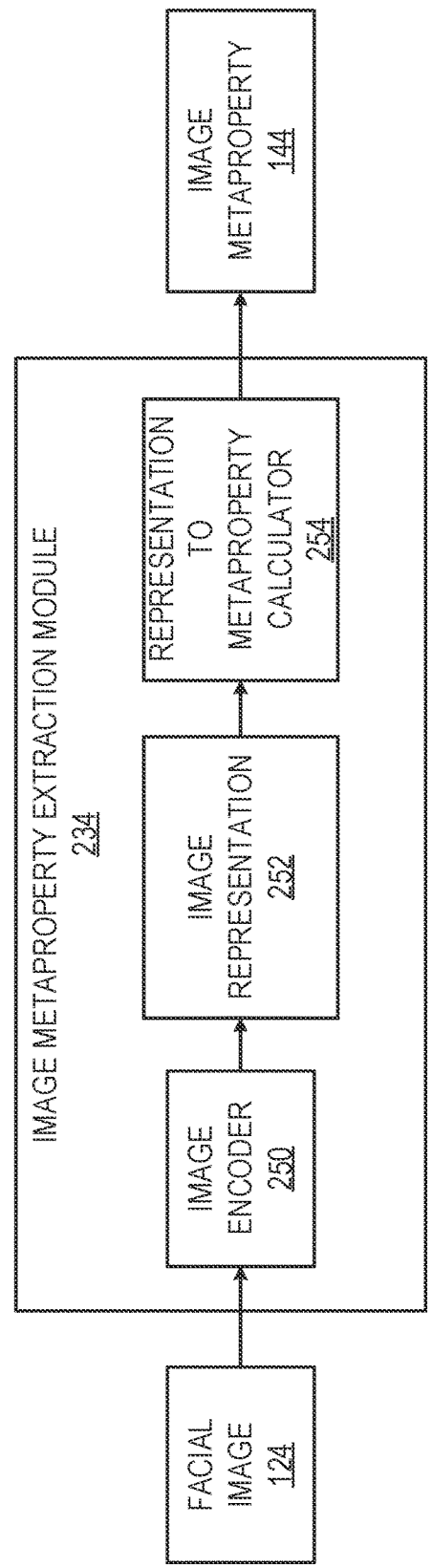
FIG. 2B depicts an image metaproperty extraction module, according to embodiment of the invention.

Similarly, each of image metaproperty extraction modules 134 may be configured to estimate, calculate or extract an image metaproperty 144 from a facial image 124. Each of image metaproperties 144 may include an identity characteristic of the person whose face is depicted in facial image 124 as the age, gender, weight, body mass index (BMI), skin tone, mother tongue, accent etc. Some image metaproperties 144 may be estimated, calculated or extracted directly from facial image 124, while other may include an intermediate stage of extracting or calculating an image representation 252, using, for example, an ML image encoder 250, and extracting, estimating or calculating image metaproperty 144 from the image representation 252, e.g., as depicted in FIG. 2B. For some image metaproperties 144, image representation 252 may include an image latent vector, an image latent matrix or an embedding. Other representations may be used.

FIG. 2A depicts a voice metaproperty extraction module 232, according to embodiments of the invention. Voice metaproperty extraction module 232 is one possible implementation of voice metaproperty extraction module 132 in which a voice representation 242 is extracted or calculated by ML voice encoder 240, and voice metaproperty 142 is extracted, estimated or calculated from voice representation 242 by representation to metaproperty calculator 244. Voice encoder 240 may include an ML model, such as an NN that may generate an embedding, a speech signature, a latent vector, a latent matrix, a spectrogram or other image representation of voice sample 122. Representation to metaproperty calculator 244 may perform any calculations required to extract, estimate or calculate a voice metaproperty 142 from a voice representation 242, including but not limited to a classical ML model, e.g., linear regression, logistic regression, support vector machines, nearest neighbor similarity search, decision trees, etc., or a deep ML model e.g., any applicable type of deep NN. It is noted that system 100 may include a plurality of types of voice encoders 240, each for a different voice metaproperty 142. For example, one voice encoder 240 may be used for generating a voice representation 242, e.g., a latent vector, that may be used for calculating voice age metaproperty, while another different voice encoder 240 may be used for generating a second representation vector 242, e.g., a spectrogram, that may be used for calculating audio gender metaproperty, etc. Other implementations of voice metaproperty extraction module 132 may be used.

FIG. 2B depicts an image metaproperty extraction module 234, according to embodiments of the invention. Image metaproperty extraction module 234 is one possible implementation of image metaproperty extraction module 134 in which an image representation 252 is extracted or calculated by ML image encoder 250, and image metaproperty 144 is extracted, estimated or calculated from image representation 252 by representation to metaproperty calculator 254. Image encoder 250 may include an ML model, such as an NN that may generate a representation such as a latent vector (e.g., face signature vectors) for facial image 124. Representation to metaproperty calculator 254 may perform any calculations required to extract, estimate or calculate an image metaproperty 144 from an image representation 252, including but not limited to a classical ML model, e.g., linear regression, logistic regression, support vector machines, nearest neighbor similarity search, decision trees, etc., or a deep ML model e.g., any applicable type of deep NN. It is noted that system 100 may include a plurality of types of image encoders 250, each for a different image metaproperty 144. For example, one image encoder 250 may be used for generating an image representation 252, e.g., a latent vector, that may be used for calculating image age metaproperty, while another image encoder 250 may be used for generating a second image representation 252, e.g., a latent matrix, that may be used for calculating image gender metaproperty, etc. Other implementations of image metaproperty extraction module 134 may be used.

Some voice metaproperties 142 and image metaproperties 144 may be categorical features, e.g., gender (at birth), while others may be continuous features, e.g., age. Some continuous features may be treated as categorical features, by dividing the entire range of possible values into sub-ranges where voice metaproperties 142 and image metaproperties 144 may include the sub-range, e.g., age of 24-32. It is noted that discretization of continuous categories may be done to ranges of varying sizes (e.g. in table 1 an age range of 18-19, which is 2 years vs. age range of 33-40 which is 7 years). Some of voice metaproperties 142 and image metaproperties 144 may include a probability distribution providing the probabilities that the voice metaproperty 142 or the image metaproperty 144 equals certain values or ranges of values of the metaproperty. An example of an age voice metaproperty (extracted from voice sample 122) is provided in Table 1. In the example of Table 1, the age is divided to the sub-ranges of under 18, 18-19, 20-24, 25-32, 33-40, 41-48, 49-56, 57-64 and over 64 years old. The result of voice metaproperty extraction modules 132 may include the probabilities that the age of the speaker is in the specified age range. Table 2 provides a similar example for gender metaproperty. In this example there are only two possible values, e.g., male and female, and the result of voice metaproperty extraction modules 132 may include the probabilities that the speaker is either male or female. Similar types or categories of metaproperties may be calculated by image metaproperty extraction modules 134 from facial image 124, with possible different values.

TABLE 1

An example of age voice metaproperty values

| Value | <18 | 18-19 | 20-24 | 25-32 | 33-40 | 41-48 | 49-56 | 57-64 | >64 |
|---|---|---|---|---|---|---|---|---|---|
| Probability | 0 | 0 | 0.15 | 0.55 | 0.24 | 0.06 | 0 | 0 | 0 |

TABLE 2

An example of gender metaproperty values

| Value | Male | Female |
|---|---|---|
| Probability | 0.85 | 0.15 |

In some embodiments, the types of image metaproperties 144 may correspond to the types of voice metaproperties 142, for example, a voice age metaproperty may be extracted from voice sample 122 and an image age metaproperty may be extracted from facial image 124. Thus, a specific image metaproperty may correspond to a specific voice metaproperty if both metaproperties are of the same or corresponding type. Similarly, other types of metaproperties may be calculated once from voice sample 122 and once from facial image 124.

In some embodiments, the metaproperties may include:

Gender [male, Female]:
- a voice gender metaproperty may be generated by extracting a voice latent vector from voice sample 122 using a voice encoder, and feeding the voice latent vector into a classical ML model trained to calculate probability distribution providing the probabilities that the speaker is a male or a female. The voice encoder, the voice latent vector and the classical ML model may be specific for the voice gender metaproperty.
- an image gender metaproperty may be generated by extracting an image latent vector from facial image 124 using an image encoder and feeding the image latent vector into a classical ML model trained to calculate probability distribution providing the probabilities that the person depicted in the image is a male or a female. The image encoder, the image latent vector and the classical ML model may be specific for the image gender metaproperty.

Age [age ranges in years]:
- a voice age metaproperty may be generated by extracting a voice latent vector from voice sample 122 using a voice encoder, and feeding the voice latent vector into a deep ML model trained to calculate probability distribution providing the probabilities that the speaker age is in each of the age ranges. The voice encoder, the voice latent vector, and deep ML model may be specific for the age gender metaproperty.
- an image age metaproperty may be generated by providing facial image 124 directly into a deep ML model trained to calculate probability distribution providing the probabilities that the age of the person depicted in the image is in each of the age ranges. The deep ML model may be specific for the image age metaproperty.

Skin tone [e.g., according to the Fitzpatrick scale]
- a categorial feature predicted on the Fitzpatrick scale having 6 possible skin tone categories ranging from types I to VI, where type I may refer to a skin tone that always burns, while type VI may refer to a skin tone that never burns. in some embodiments, each of the image and voice skin tone metaproperties may be extracted using a classifier or deep ML model (e.g., an NN, CNN, transformer or an auto-encoder). In some embodiments, the image skin tone metaproperty may be extracted or predicted by feeding facial image 124 into a transformer, e.g. a vision transformer, and the voice skin tone metaproperty may be extracted by generating a latent matrix e.g. in the form of a Mel spectrogram and performing predictions on the latent matrix using transformers, e.g. a vision transformer. Other scales and/or methods may be used.

Ethnicity [Asian, Black, White, Middle-Eastern, Indian, Latino Hispanic]
- Each of the age and voice ethnicity metaproperties may be extracted, for example, using a classifier or deep ML model (e.g., an NN, CNN, transformer or an auto-encoder). Other models may be used.

Weight, measures in kilograms. Attains non-negative values.

Body Mass Index (BMI)

Mother tongue.

Accent.

Returning to FIG. 1, voice metaproperties 142 and image metaproperties 144 may be fed into distance calculator 150, that may calculate a distance, e.g., Euclidean distance, cosine distance (e.g., equals one minus cosine similarity) or other measures of distance, between each of voice metaproperties 142 and its corresponding image metaproperty 144, e.g., between the audio gender metaproperty and the image gender metaproperty, between the audio age metaproperty and the image age metaproperty, etc. It is noted that other relationships between voice metaproperties 142 and image metaproperties 144 may be calculated by distance calculator 150. The distances may be provided as distance vector d (e.g., an ordered list of the distances). Distance calculator 150 may further calculate a weighted sum of the distances (and/or the other relationships between voice metaproperties 142 and image metaproperties 144) using weights 162, e.g., by multiplying each distance value by a weight and adding the multiplications. The weighted sum may be provided to classifier 160 that may determine whether voice sample 122 matches facial image 124 (e.g., whether both originate from the same person) or not. For example, classifier 160 may determine whether voice sample 122 matches facial image 124 if the weighted sum satisfies a threshold condition (e.g., is higher than a threshold), and that voice sample 122 does not match facial image 124 otherwise. Other conditions may be used. Classifier training block 164 may use labels 126 and the classification provided by classifier 160 to train classifier 160. Weights 162 may be derived from the trainable parameters of classifier 160, e.g., weights 162 may be the trainable parameters of classifier 160 or may be calculated using weights 162 . . . . Typically, equal number of random positive pairs (e.g., pairs of matching voice sample 122 and facial image 124) and random negative pairs (e.g., pairs of unmatching voice sample 122 and facial image 124) may be used for training, however this is not mandatory. For example, classifier training block 164 may train classifier 160 by adjusting weights 162 (that are derived from the trainable parameters of classifier 160) of the weighted sum operation to minimize a loss function that measure the error between the know label 126 and the prediction of classifier 160. In some embodiments classifier 160 may be a binary classifier, e.g., an ML algorithm that categorizes samples into one of two classes and allows weights extraction. Examples for a binary classifier may include a logistic regression classifier, an extreme gradient boosting (XG-Boost) classifier, a random forest classifier, etc.

As noted, weights 162 used for the weighted sum operation of classifier 160 may be derived or calculated from the parameters or coefficients of classifier 160. For example, in case a logistic regression classifier is used for classifier 160, the weights may be the coefficients of the logistic regression, each multiplied by the standard deviation of the corresponding component. For example, in case of two metaproperties, gender and age, classifier 160 may be trained on vectors (gender_distance, age_distance), where gender_distance is a vector including the distances between the voice gender metaproperty and the corresponding image gender metaproperty of the samples used for training, and age_distance is the a vector including the distances between the voice age metaproperty and the corresponding image age metaproperty of the samples used for training. After training, a logistic regression with parameters beta_0, beta_1 and beta_2 is obtained. Thus, the weight of the gender metaproperty in this example would be beta_1×std_of_gender_distances and the weight of the age metaproperty would be beta_2×std_of_age_distances, where std_of_gender_distances and std_of_age_distances are the standard deviations of the gender_distance and age_distance vectors, respectively. Other ways for deriving the weights from the parameters of trained classifier 160 may be used.

According to some embodiments, classifier 160 may be initially trained with equal number of positive and negative pairs in order to avoid leaning towards positiveness or negativeness. Thereafter, weighted training may be applied as described infra. A distance vector d may be calculated for pair 120, and classifier 160 may predict that pair 120 is a positive pair (e.g., that the voice sample and the facial image in pair 120 match or originate from the same person) in probability p. A confidence level c (d) may be calculated by, for example:

$$c(d) = \max(p, 1-p)$$

I. The ground truth label may be denoted as $y_{true}(d)$, and the predicted label may be denoted as $y_{pred}(d)$. Two thresholds may be used $\varepsilon_{strong}, \varepsilon_{weak} \in [0.5, 1]$, and the distance vector d may be categorised as hard, medium and easy according to: Hard—the prediction of the model is wrong with high confidence level:

$$\begin{cases} y_{pred(d)} \neq y_{true}(d) \\ c(d) > \varepsilon_{strong} \end{cases}$$

II. Medium—the prediction of the model is right or wrong with medium confidence level:

$$\begin{cases} y_{pred(d)} \neq y_{true}(d) \\ \varepsilon_{weak} < c(d) > \varepsilon_{strong} \end{cases}$$

III. Easy—the prediction of the model is correct with high confidence level:

$$\begin{cases} y_{pred(d)} = y_{true}(d) \\ c(d) > \varepsilon_{strong} \end{cases}$$

The categorization of the weighted sum d may allow retraining classifier 160 in different manners, for example:

Curriculum learning-ordering pairs 120 in increasing difficulty, first easy, then medium and lastly hard. A known phenomenon in biology called 'shaping' implies that animal brains learn quicker when the learning is done gradually from easier to harder examples alluding to more complex and richer concepts in the data. This phenomenon can be transferred to machine learning, e.g., after ordering pairs 120 in increasing difficulty classifier 160 may be trained gradually starting from the easy, then medium and lastly hard pairs 120.

Learning through difficulty-adjusted weights-giving the lowest effect on the training process (e.g., the lowest effect on adjusting weights 162) for pairs 120 categorised as easy, higher effect on adjusting weights 162 for pairs 120 categorised as medium, and the highest effect on adjusting weights 162 for pairs 120 categorised as hard.

Not using pairs 120 categorised as easy and pairs 120 categorised as hard in the training process, since pairs 120 that are categorised as easy may not contribute much to the training process and pairs 120 categorised as hard may be too challenging for the model training. This method may result in different number of positive and negative pairs 120.

Other methods for training classifier 160 may be used.

Figure 3:
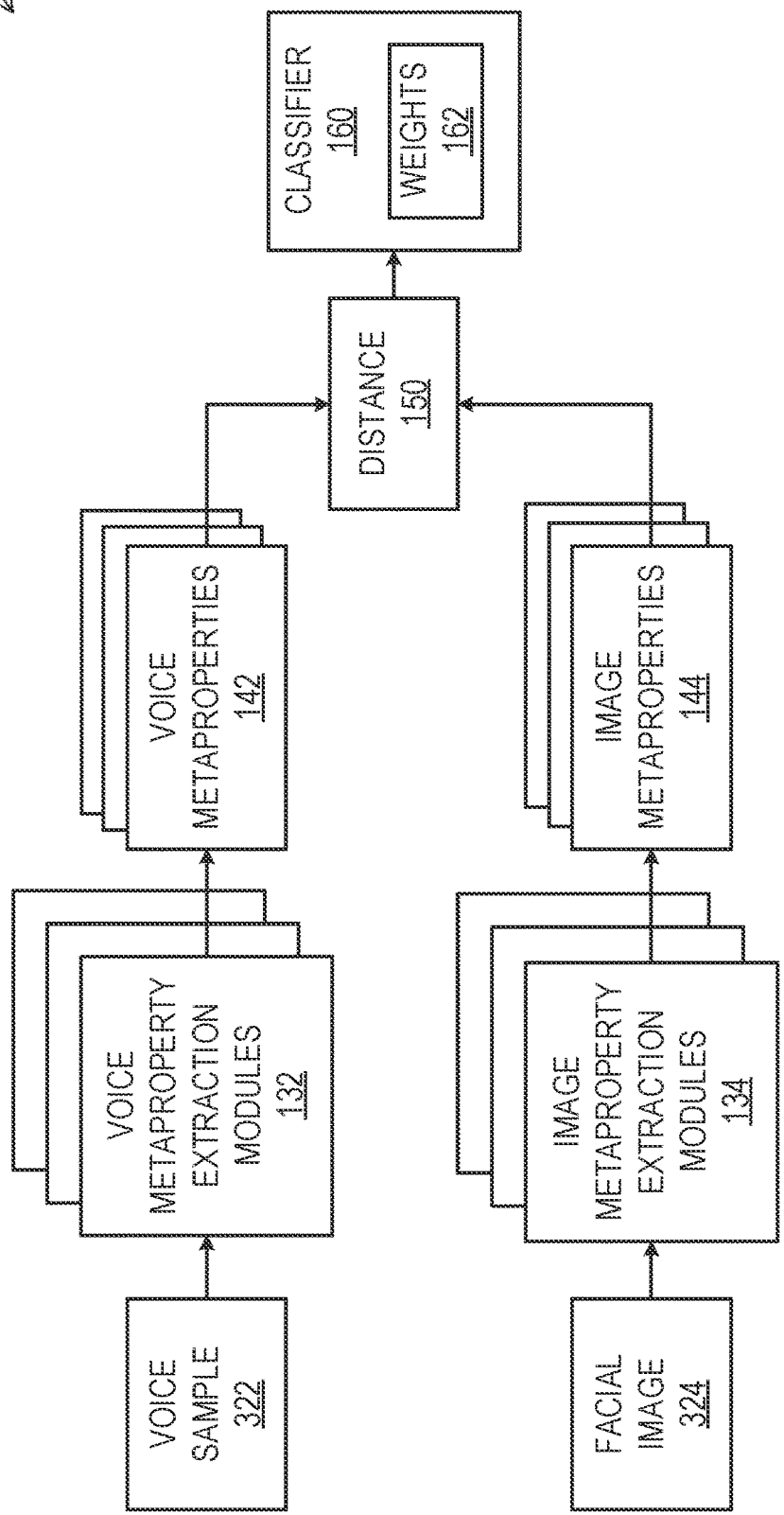
FIG. 3 depicts a system for voice-face matching using a trained classifier, according to embodiment of the invention.

Reference is made to FIG. 3, which depicts a system 300 for voice-face matching using a trained classifier 160, according to embodiment of the invention. It should be understood in advance that the components and functions shown in FIG. 3 are intended to be illustrative only and embodiments of the invention are not limited thereto. While in some embodiments the system of FIG. 3 is implemented using systems as shown in FIG. 6, in other embodiments other systems and equipment can be used.

System 300 may obtain a new voice sample 322 and a new facial image 324. New in this context implies that new voice sample 322 and a new facial image 324 are not labelled and system 300 does not know in advance whether new voice sample 322 and new facial image 324 match or not. Voice metaproperty extraction modules 132 may extract voice metaproperties 142, image metaproperty extraction modules 134 may extract image metaproperties 144, and distance calculator 150 may calculate distances or other relations between voice metaproperties 142 and their corresponding image metaproperties 144, similarly to system 100. Classifier 162 may use the trained weights 162, to calculate a weighted sum of the distances and may provide, based on the weighted sum of the distances, a determination whether new voice sample 322 and a new facial image 324 match or not, or a level of match between the voice sample and the facial image. For example, the level of match may equal the weighted sum and the determination may be provided by testing the level of match against a threshold, e.g., classifier 160 may determine that new voice sample 322 matches new facial image 324 if the weighted sum satisfies a threshold condition, and that new voice sample 322 does not match new facial image 324 otherwise.

According to some embodiments, system 300 may be used for reconstructing a facial image of a specker by, for example, obtaining a voice sample 322 or the specker and a plurality of facial images 324, determining a level of match between voice sample 322 and each of facial images 324, selecting the facial images with the highest level of match, and reconstructing the face of the speaker in voice sample 322 by fusing the selected facial images. Selecting the facial images with the highest level of match may include, for example, selecting facial images with a level of match that satisfies (e.g., that is higher than) a threshold, selecting a predetermined number N or a predetermined percentage P of facial images with the highest level of match. For example, the plurality of facial images 324 may be ordered according to their level of match, and the top N ranked facial images or the top P percentage of facial images may be selected.

Figure 4:
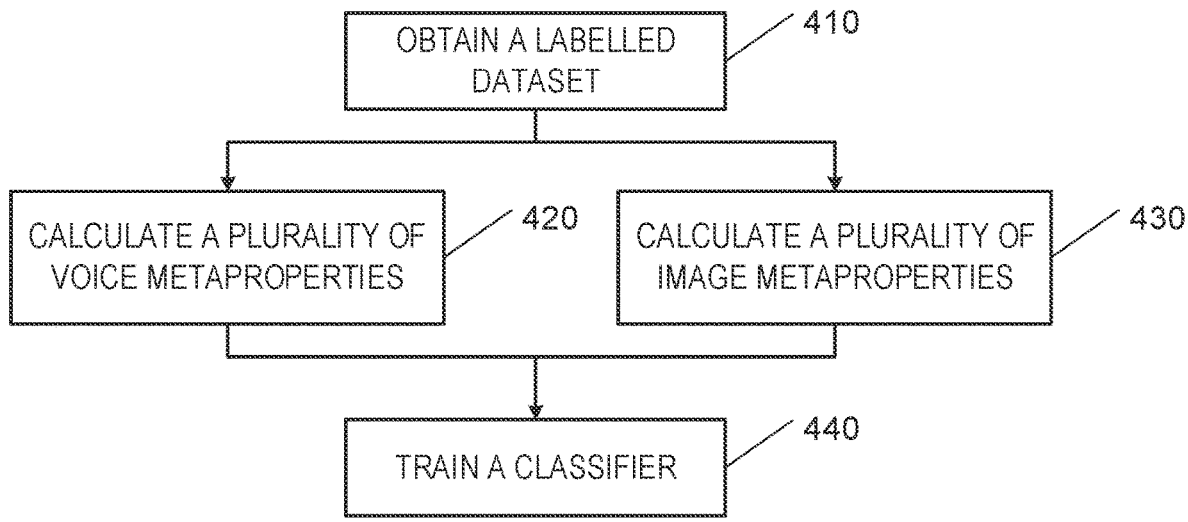
FIG. 4 is a flowchart of a method for training a classifier for voice-face matching, according to embodiments of the invention.

Reference is now made to FIG. 4, which is a flowchart of a method for training a classifier for voice-face matching, according to embodiments of the invention. While in some embodiments the operations of FIG. 4 are carried out using systems as shown in FIGS. 1 and 6, in other embodiments other systems and equipment can be used.

In operation 410, a processor (e.g., processor 705 depicted in FIG. 6), may obtain a labelled dataset including a plurality of matching pairs labelled as matching pairs, and including a matching voice sample and facial image, and a plurality of unmatching pairs, labelled as unmatching pairs, and including an unmatching voice sample and facial image. In operation 420, the processor may calculate a plurality of voice metaproperties for each of the voice samples, as disclose herein. In operation 430, the processor may calculate a plurality of image metaproperties for each of the images, as disclose herein. In operation 440, the processor may use the plurality of voice metaproperties and the plurality of image metaproperties of the plurality of matching pairs and the plurality of unmatching pairs, and the associated labels, to train the classifier. For example, the processor may calculate distances between corresponding voice metaproperties and image metaproperties, and a weighted sum of those distances, and may train the classifier by adjusting the trainable parameters of the classifier which are the weights of the weighted sum operation, to minimize a loss function that measure the error between the know label and the prediction of the classifier.

Figure 5:
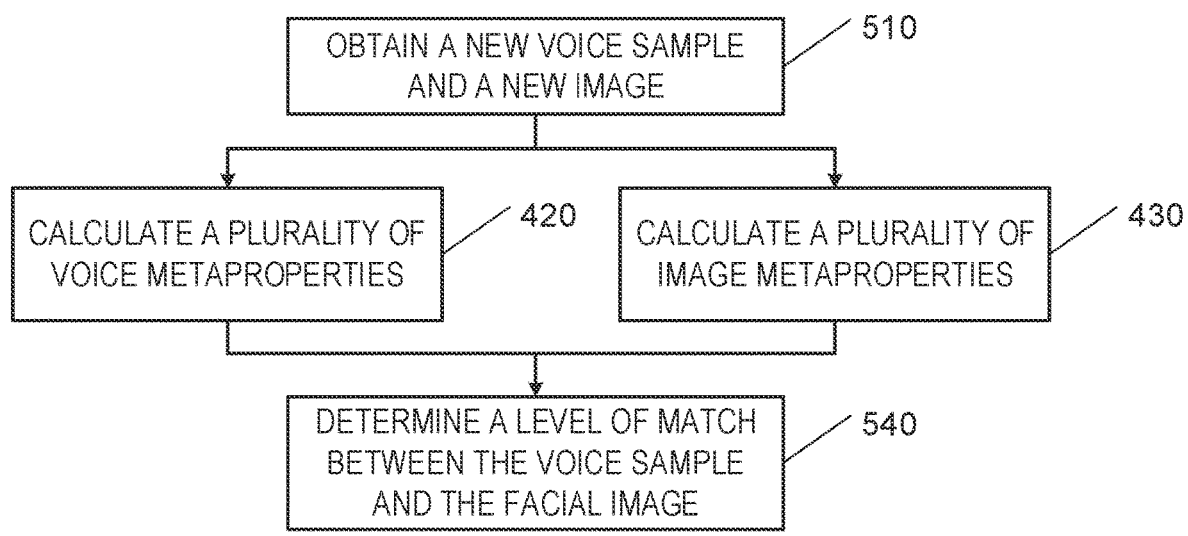
FIG. 5 is a flowchart of a method for matching a voice sample to a facial image using a trained classifier, according to embodiments of the invention.

Reference is now made to FIG. 5, which is a flowchart of a method for matching a voice sample to a facial image using a trained classifier, according to embodiments of the invention. While in some embodiments the operations of FIG. 5 are carried out using systems as shown in FIGS. 3 and 6, in other embodiments other systems and equipment can be used.

In operation 510, a processor (e.g., processor 705 depicted in FIG. 6), may obtain a voice sample and a facial image that are not labelled, e.g., processor 705 may not have prior knowledge on whether the voice sample and the facial image belong to the same person or not. In operation 420, the processor may calculate a plurality of voice metaproperties for the voice sample and in operation 430 the processor may calculate a plurality of image metaproperties for the image, as disclose herein. In operation 540, the processor may use the plurality of voice metaproperties and the plurality of image metaproperties to determine a level of match between the voice sample and the facial image. For example, the processor may provide the plurality of voice metaproperties and the plurality of image metaproperties to the classifier trained in operation 440.

FIG. 6 shows a high-level block diagram of an exemplary computing device which may be used with embodiments of the present invention. Computing device 700 may include a controller or processor 705 that may be or include, for example, one or more CPUs, GPUs, TPUs and/or a chip or any suitable computing or computational device, an operating system 715, a memory 720, a storage 730, input devices 735 and output devices 740. Each of modules and equipment such as voice-face matching model 234 and loss calculation module 260, as systems 100 and 200 shown in FIGS. 1 and 3, respectively, or other modules described herein, may be executed by, a computing device such as included in FIG. 6 or specific components of FIG. 6, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g., code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a solid-state drive, a floppy disk drive, a Compact Disk (CD) drive, or other suitable removable and/or fixed storage unit. Data such as instructions, code, facial images, voice samples, training data, model weights and parameters etc. may be stored in a storage 730 and may be loaded from storage 730 into a memory 720 where it may be processed by processor 705. Some of the components shown in FIG. 6 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for matching a voice sample to a facial image, the method comprising, using a processor:
    obtaining a voice sample and a facial image;
    calculating a plurality of voice metaproperties from the voice sample;
    calculating a plurality of image metaproperties from the facial image, wherein each of the image metaproperties corresponds to one of the voice metaproperties, wherein each of the voice metaproperties and the image metaproperties comprises a probability distribution providing the probabilities that the voice metaproperty or the image metaproperty equals certain values of the metaproperty; and
    determining a level of match between the voice sample and the facial image, based on the plurality of voice metaproperties and the plurality of image metaproperties, wherein determining whether the voice sample matches the facial image is performed by:
        calculating a distance between each of the voice metaproperties and the corresponding image metaproperty;
        calculating weights for a weighted sum operation by training a classifier and deriving the weights from the parameters of the classifier;
        calculating the weighted sum of the distances; and
        determining that the voice sample matches the facial image if the weighted sum satisfies a threshold condition, and that the voice sample does not match the facial image otherwise,
    wherein the classifier is trained by:
        obtaining a labelled dataset comprising a plurality of matching pairs labelled as matching pairs, and a plurality of unmatching pairs, labelled as unmatching pairs, wherein each of the matching pairs comprises a matching labelled voice sample and labelled facial image, and each of the unmatching pairs comprises an unmatching labelled voice sample and labelled facial image;
        calculating, for each of the labelled voice samples, the plurality of voice metaproperties from the labelled voice sample;
        calculating, for each of the labelled facial images, the plurality of image metaproperties from the labelled facial image; and
        using the plurality of voice metaproperties and the plurality of image metaproperties of the plurality of matching pairs and the plurality of unmatching pairs, and the associated labels, to train the classifier.

2. The method of claim 1, wherein the classifier is a binary classifier.

3. The method of claim 1, wherein calculating one voice metaproperty of the plurality of voice metaproperties comprises:
    encoding the voice sample into a voice representation using a voice encoder; and
    calculating the one voice metaproperty of the plurality of voice metaproperties from the voice representation;
and wherein calculating one image metaproperty of the plurality of image metaproperties comprises:
    encoding the facial image into an image representation using a face encoder; and
    calculating one image metaproperty of the plurality of image metaproperties from the image representation.

4. The method of claim 1, wherein each of the metaproperties comprises an identity characteristic of an individual.

5. The method of claim 1, wherein the metaproperties comprise at least one property selected from: age, gender, weight, body mass index (BMI), skin tone, mother tongue and accent.

6. The method of claim 1, comprising:
    obtaining a plurality of facial images;
    determining a level of match between the voice sample and each the facial images;
    selecting the facial images with a highest level of match; and
    reconstructing the face of the speaker in the voice sample by fusing the selected facial images.

7. A system for matching a voice sample to a facial image, the system comprising:
    a memory; and
    a processor configured to:
        obtain a voice sample and a facial image;

calculate a plurality of voice metaproperties from the voice sample;

calculate a plurality of image metaproperties from the facial image, wherein each of the image metaproperties corresponds to one of the voice metaproperties, wherein each of the voice metaproperties and the image metaproperties comprises a probability distribution providing the probabilities that the voice metaproperty or the image metaproperty equals certain values of the metaproperty; and determine a level of match between the voice sample and the facial image, based on the plurality of voice metaproperties and the plurality of image metaproperties, by:

calculating a distance between each of the voice metaproperties and the corresponding image metaproperty;

calculating a weighted sum of the distances; and determining that the voice sample matches the facial image if the weighted sum satisfies a threshold condition, and that the voice sample does not match the facial image otherwise, wherein the processor is configured to calculate weights for the weighted sum operation by training a classifier and deriving the weights from the parameters of the classifier, and wherein the processor is configured to train the classifier by:

obtaining a labelled dataset comprising a plurality of matching pairs labelled as matching pairs, and a plurality of unmatching pairs, labelled as unmatching pairs, wherein each of the matching pairs comprises a matching labelled voice sample and labelled facial image, and each of the unmatching pairs comprises an unmatching labelled voice sample and labelled facial image;

calculating, for each of the labelled voice samples, the plurality of voice metaproperties from the labelled voice sample;

calculating, for each of the labelled facial images, the plurality of image metaproperties from the labelled facial image; and using the plurality of voice metaproperties and the plurality of image metaproperties of the plurality of matching pairs and the plurality of unmatching pairs, and the associated labels, to train the classifier.

8. The system of claim 7, wherein the classifier is a binary classifier.

9. The system of claim 7, wherein the processor is configured to calculate one voice metaproperty of the plurality of voice metaproperties by:

encoding the voice sample into a voice representation using a voice encoder; and calculating the one voice metaproperty of the plurality of voice metaproperties from the voice representation;

and wherein calculating one image metaproperty of the plurality of image metaproperties comprises:

encoding the facial image into an image representation using a face encoder; and calculating one image metaproperty of the plurality of image metaproperties from the image representation.

10. The system of claim 7, wherein each of the metaproperties comprises an identity characteristic of an individual.

11. The system of claim 7, wherein the metaproperties comprise at least one property selected from: age, gender, weight, body mass index (BMI), skin tone, mother tongue and accent.

12. The system of claim 7, wherein the processor is configured to:

obtain a plurality of facial images;

determine a level of match between the voice sample and each the facial images;

selecting the facial images with a highest level of match; and reconstruct the face of the speaker in the voice sample by fusing the selected facial images.

* * * * *